Figure 1:
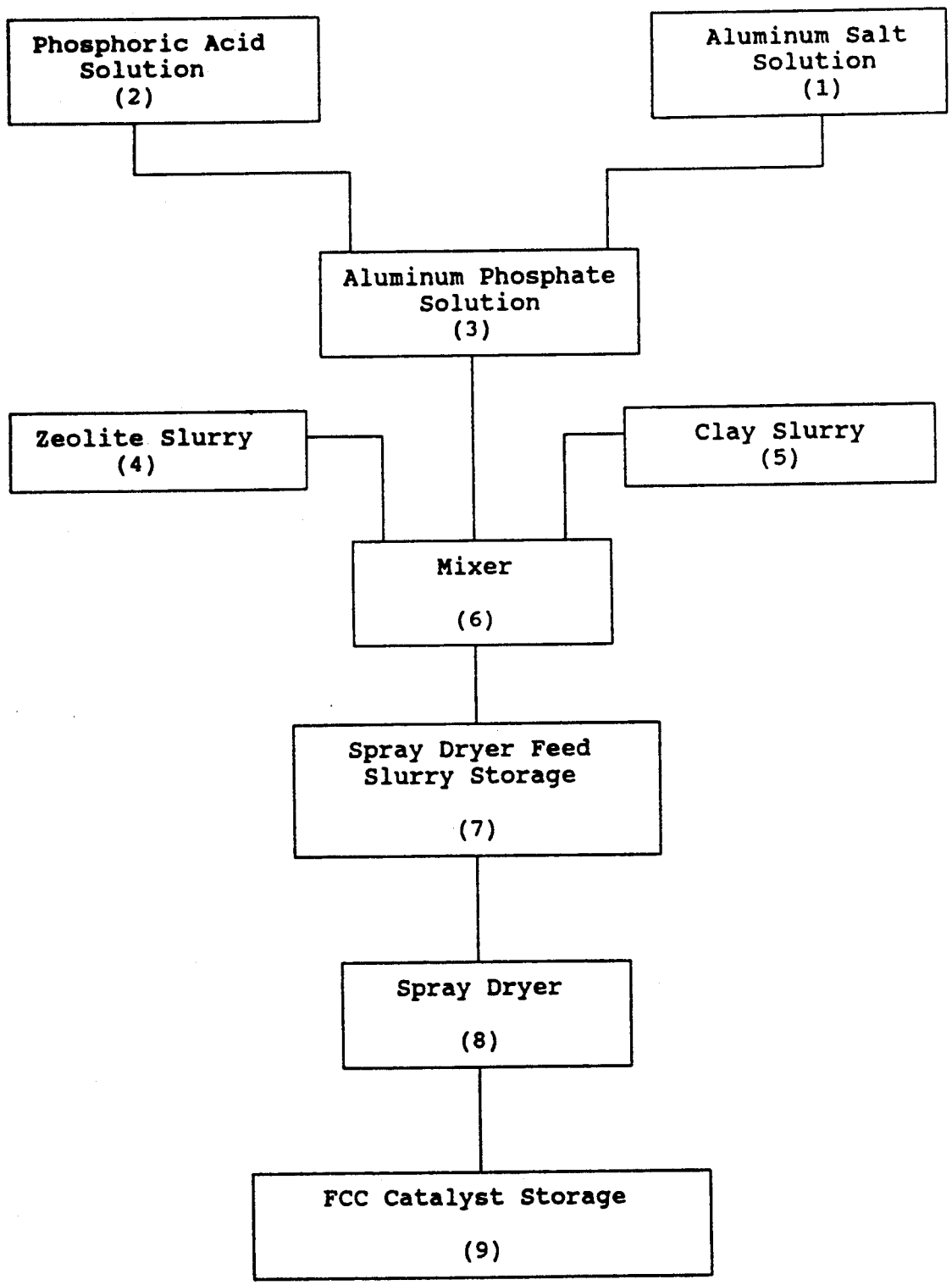

United States Patent [19]
Roberie et al.

[11] Patent Number: 5,286,369
[45] Date of Patent: Feb. 15, 1994

[54] CATALYTIC CRACKING UTILIZING A ZEOLITE AND ALUMINUM PHOSPHATE-CONTAINING CATALYST

[75] Inventors: Terry G. Roberie, Ellicott City; John F. Terbot, II, Abingdon, both of Md.

[73] Assignee: W. R. Grace & Co.-Conn., New York, N.Y.

[21] Appl. No.: 966,488

[22] Filed: Oct. 26, 1992

Related U.S. Application Data

[62] Division of Ser. No. 643,980, Jan. 22, 1991, Pat. No. 5,194,412.

[51] Int. Cl.$^5$ ............................................. C10G 11/02
[52] U.S. Cl. .................................................... 208/114
[58] Field of Search ................... 208/46, 108, 114, 134

[56] References Cited

U.S. PATENT DOCUMENTS

| | | |
|---|---|---|
| 4,158,621 | 6/1979 | Swift et al. ............. 208/114 |
| 4,179,358 | 12/1979 | Swift et al. ............. 208/114 |
| 4,724,066 | 2/1988 | Kirker et al. ............ 208/114 |
| 4,765,884 | 8/1988 | Walker et al. .......... 208/114 |

*Primary Examiner*—R. Bruce Breneman
*Assistant Examiner*—Walter D. Griffin
*Attorney, Agent, or Firm*—Savage Arthur P.

[57] ABSTRACT

Catalyst compositions are described which comprise crystalline molecular sieve zeolites and an aluminum phosphate component having a surface area of less than about 50 m$^2$/g and a high degree of attrition resistance. The catalysts are particularly effective for the catalytic cracking of high molecular hydrocarbon feedstocks to obtain enhanced yields of C$_3$ and C$_4$ olefins such as isobutylene.

6 Claims, 9 Drawing Sheets

CATALYTIC CRACKING UTILIZING A ZEOLITE AND ALUMINUM PHOSPHATE-CONTAINING CATALYST

This is a division of application Ser. No. 643,980, filed Jan. 22, 1991 now U.S. Pat. No. 5,194,412.

The present invention relates to improved catalytic cracking catalysts, and more specifically to attrition resistant zeolite/aluminum phosphate (AlPO$_4$) containing FCC catalysts that are particularly selective for the production of C$_3$ and C$_4$ olefins.

Catalysts and zeolites which include a phosphorus component are described in the following references.

U.S. Pat. No. 3,354,096 describes zeolite containing adsorbent and catalyst compositions which contain a phosphate binding agent to improve physical strength.

U.S. Pat. No. 3,649,523 describes hydrocracking catalysts which comprise a zeolite and an aluminum phosphate gel matrix.

U.S. Pat. Nos. 4,454,241, 4,465,780, 4,498,975 and 4,504,382 describe zeolite catalysts that are prepared from clay which are further modified by the addition of a phosphate compound to enhance catalytic activity.

U.S. Pat. Nos. 4,567,152, 4,584,091, 4,629,717 and 4,692,236 describe zeolite containing catalytic cracking catalysts that include phosphorus containing alumina.

U.S. Pat. Nos. 4,605,637, 4,578,371, 4,724,066 and 4,839,319 describe phosphorus and aluminum phosphate modified zeolites such as ZSM-5, Beta and ultrastable Y that are used in the preparation of catalytic compositions, including catalytic cracking catalysts.

U.S. Pat Nos. 4,765,884 and 4,873,211 describe the preparation of cracking catalysts which consist of a zeolite and a precipitated alumina phosphate gel matrix.

While the prior art describes phosphorus modified zeolite and catalyst compositions which possess desirable catalytic or physical properties, highly attrition resistant catalytic cracking catalysts that are capable of producing high yields of C$_3$ and C$_4$ olefins, and isobutylene in particular have not been described.

It is therefore an object of the present invention to provide improved catalytic compositions which include a zeolite and aluminum phosphate.

It is a further object to provide a method for preparing zeolite/alumina phosphate catalytic cracking catalysts which are highly attrition resistant and selective for the production of C$_3$ and C$_4$ olefins.

It is yet a further object to provide a fluid catalytic cracking (FCC) catalyst which is resistant to attrition and capable of producing enhanced yields of isobutylene.

It is still a further object to provide an FCC process which is capable of producing high yields of isobutylene that may be used in the production of methyl tertiary butyl ether (MTBE).

Figure 2:
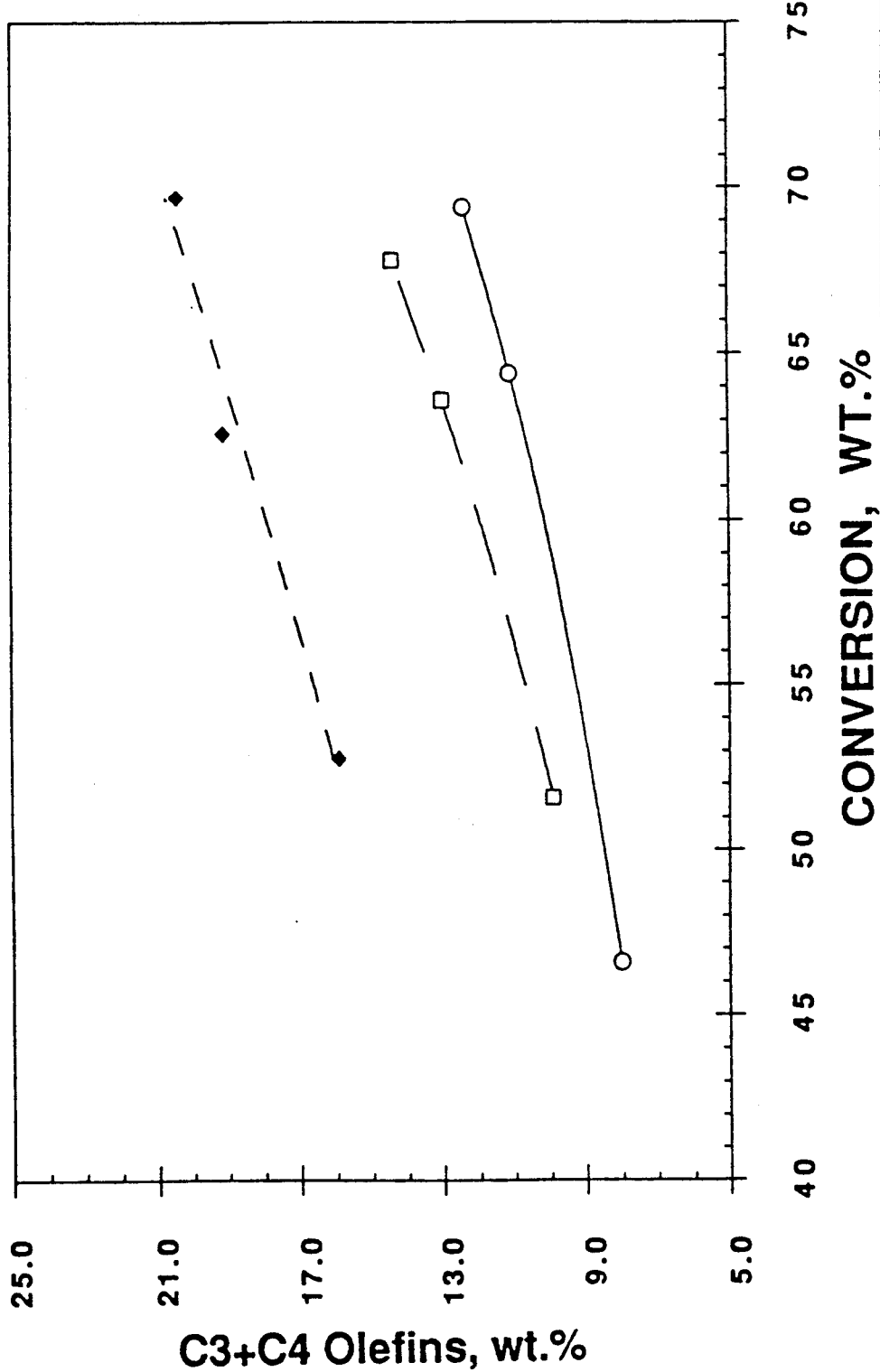
Figure 3:
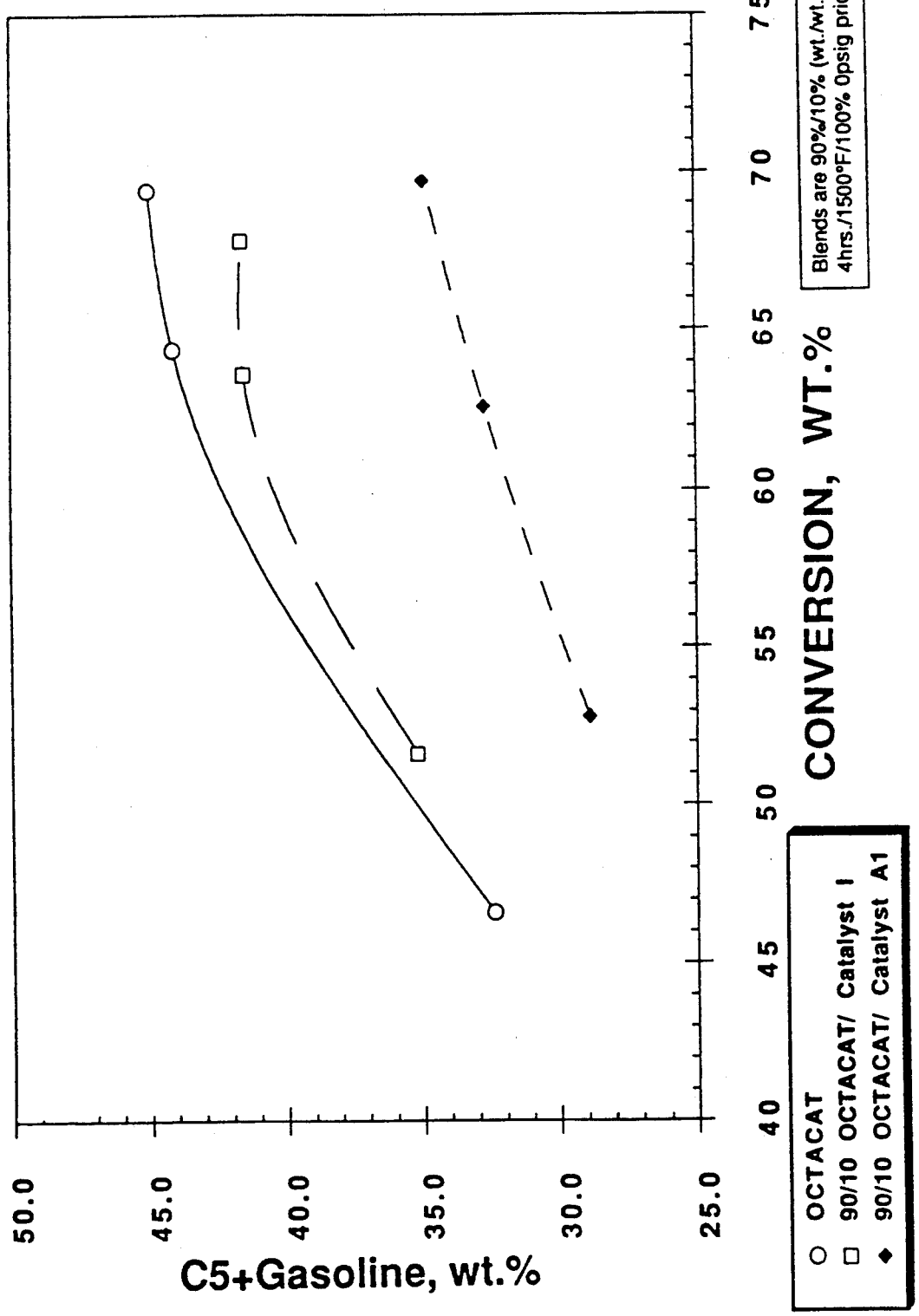
Figure 4:
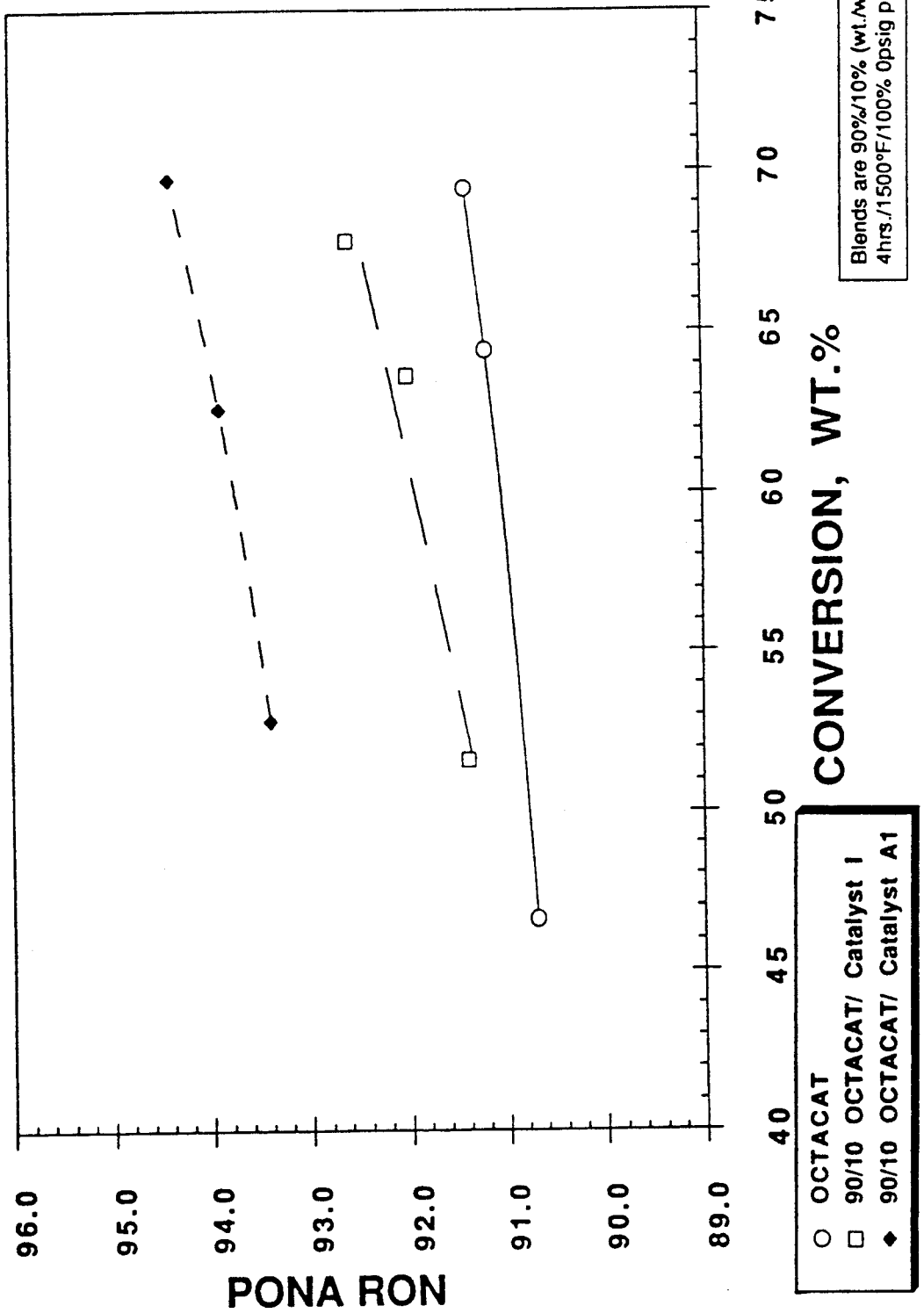
Figure 5:
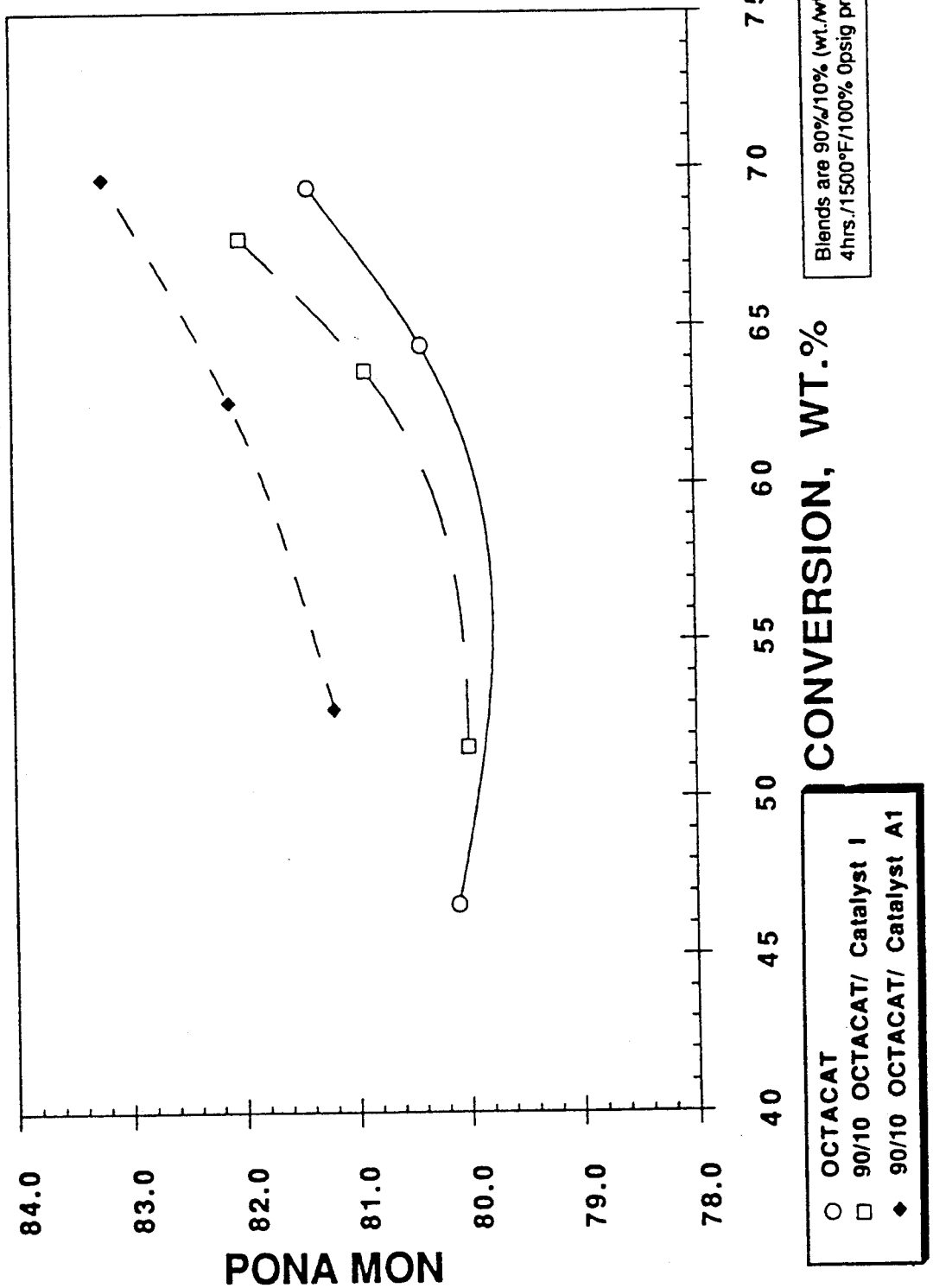
Figure 6:
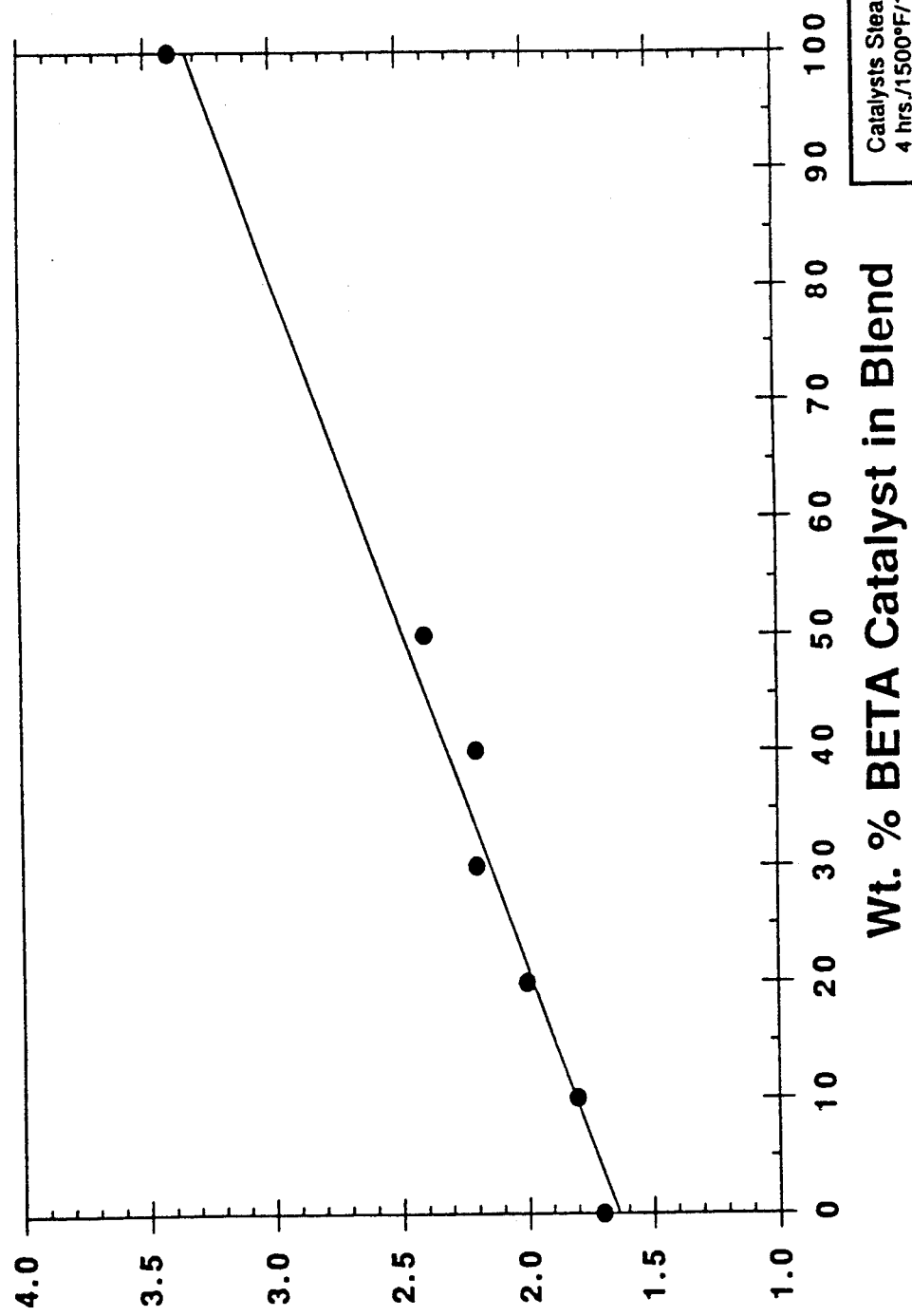
Figure 7:
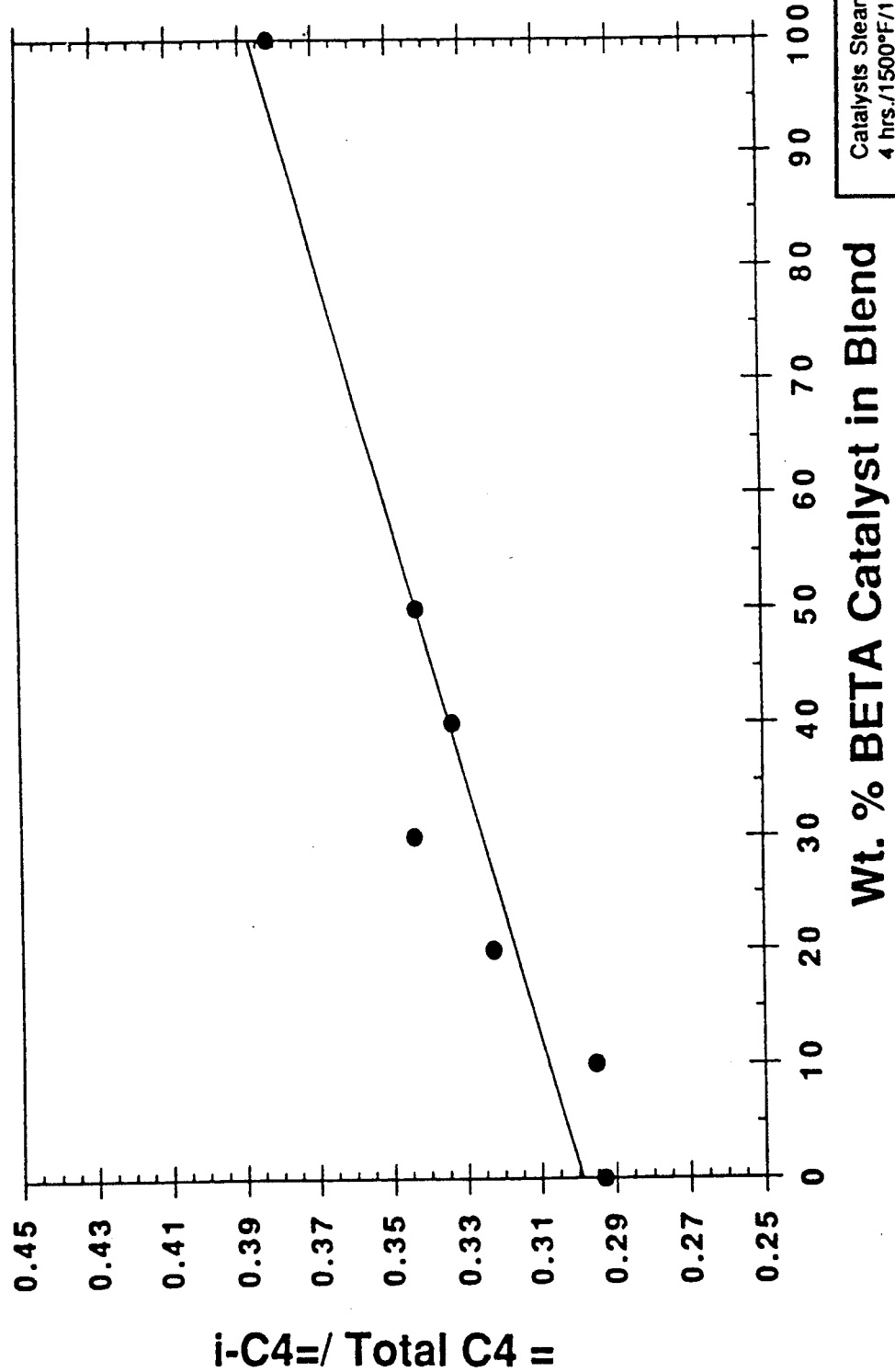
Figure 8:
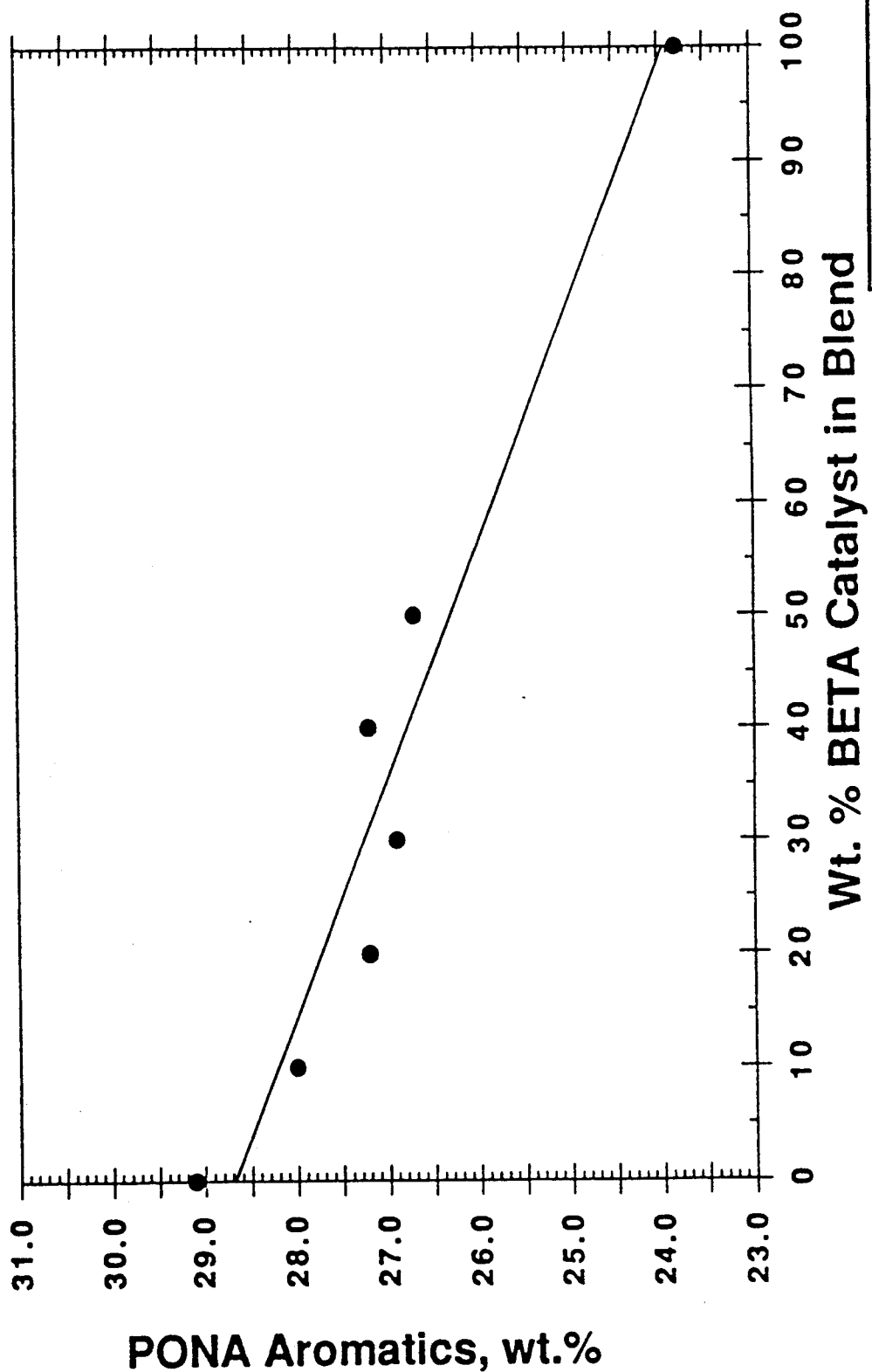

These and still further objects will become apparent to one skilled-in-the-art from the following detailed description and drawing wherein FIG. 1 is a flow diagram which illustrates a preferred process for preparing the novel catalysts of the present invention; and FIGS. 2 through 9 are graphic presentations of data obtained during evaluation of catalyst compositions of the present invention in which FIG. 2 plots C$_3$ and C$_4$ olefin agent vs. conversion;

FIG. 3 plots C$_5$+gasoline yield vs. conversion;

FIG. 4 plots PONA RON (the research octane number of the parafins, olefins, naphthenes and aromatics contained in the C$_5$+gasoline fraction) vs. conversion;

FIG. 5 plots PONA MON (motor octane number vs. conversion;

FIG. 6 plots isobutylene yields vs. wt. % Beta catalyst in catalyst blend;

FIG. 7 plots isobutylene selectivity vs. wt. % Beta catalyst in the catalyst blend;

FIG. 8 plots PONA aromatics vs. wt. % Beta catalyst in the catalyst blend; and

Figure 9:
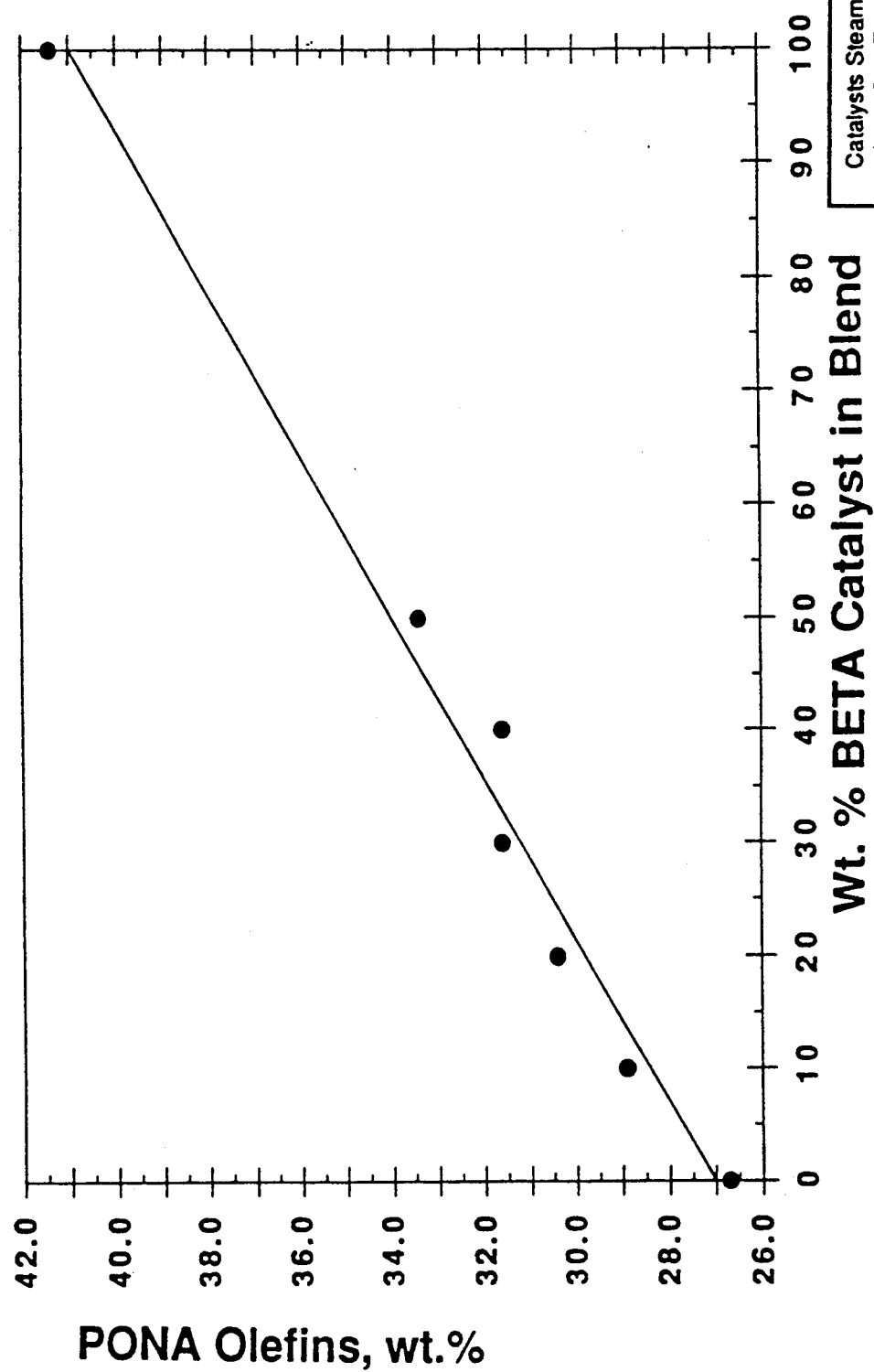

FIG. 9 plots PONA olefin yields vs. wt. % Beta catalyst in the catalyst blend.

Broadly, our invention contemplates a catalyst which comprises a zeolite and an aluminum phosphate component having a surface area of below about 50 m$^2$/g.

More specifically, we have found that highly active and attrition resistant catalysts may be prepared by mixing a solution of aluminum phosphate having a pH of about 0 to 1 and preferably 0.1 to 0.7, with a crystalline zeolite, and optionally a finely divided particulate inorganic oxide component such as clay, and with the resultant mixture having a pH of about 0 to 2, preferably 0.1 to 0.9, and forming/drying the mixture to obtain catalytic composites having desired shape and size.

A preferred method for preparing the FCC catalysts of the present invention is outlined in FIG. 1 wherein an aluminum salt solution (1), preferably an aluminum nitrate solution containing 29 to 61 wt. % Al(NO$_3$)$_3$.9-H$_2$O is combined with phosphoric acid solution (2) preferably containing 20 to 86 wt. % H$_3$PO$_4$ to obtain an aluminum phosphate solution (3) having a pH of preferably 0.5 to 0.9 and an Al to PO$_4$ mol ratio of preferably 0.4 to 1.4. The aluminum phosphate solution is combined with aqueous slurries of (4) zeolite such as Beta and clay, (5) preferably kaolin, under high shear mixing conditions at (6) to obtain a spray drier feed slurry (7) that contains 20 to 45% solids which preferably comprises (dry basis) 8 to 25 wt. % aluminum phosphate, 10 to 40 wt. % zeolite and 35 to 82 wt. % kaolin.

The catalyst slurry is held in a spray dryer feed storage tank (8) under mixing conditions until spray dried at (9) at a temperature of 200° to 400° C. During the drying process the aluminum phosphate solution is converted into a binder. The particulate spray dried FCC catalyst has a particle size range of 20 to 150 microns and is held in an FCC catalyst storage container prior to use.

The FCC catalyst may be used in a conventional FCC unit wherein the catalyst is reacted with a hydrocarbon feedstock at 400° to 700° C. and regenerated at 500° to 850° C. to remove coke. Typically, the catalyst possesses a Davison attrition index (DI) of 0 to 25, and preferably 0 to 7, as determined by the Davison Attrition Index Test described as follows.

A 7.0 gram sample of catalyst is screened to remove particles in the 0 to 20 micron size range. The particles above 20 microns are then subjected to a 1 hour test in a standard Roller Particle Size Analyzer using a hardened steel jet cup having a precision bored orifice. An air flow of 21 liters a minute is used. The Davison Index is calculated as follows:

$$\text{Davison Index} = \frac{\text{wt. \% 0-20 micron material formed during test}}{\text{wt. original 20 + micron fraction}}$$

The aluminum salt solution may contain aluminum nitrate, chloride, or other suitable soluble aluminum salts and is combined with phosphoric acid in amounts to obtain an Al to PO₄ ratio of 0.4 to 1.4 and preferably 1 to 1, a pH of below 2 and preferably 0.1 to 0.9 and a solid concentration of 7 to 17 wt. % as aluminum phosphate. The zeolite component may comprise any acid resistant zeolite or molecular sieve having a silica to alumina molar ratio in excess of about 8 and preferably from about 15 to infinity. Particularly preferred zeolite/molecular sieves include zeolite Beta, ZSM zeolites such as ZSM-5, ZSM-11, ZSM-12, ZSM-20, ZSM-23, ZSM-35, ZSM-38, and ZSM-50, ultrastable Y zeolite (USY), mordenite, SAPO, aluminum phosphate and mixtures thereof. In particular, ZSM-5 is described in U.S. Pat. No. 3,702,886; zeolite Beta in U.S. Pat. No. 3,308,069; and ultrastable Y zeolite in U.S. Pat. Nos. 3,293,192 and 3,449,070.

While clay, such as kaolin, having a surface area of about 40 to 60 m$^2$/g, is preferably included as a component of FCC catalyst prepared in accordance with the present invention, other finely divided inorganic components such as other types of clays, silica, alumina, silica-alumina gels and sols may be included.

The pH of the resulting mixture consisting of zeolite, aluminum phosphate binder, clay, other inorganic oxides, and water should have a pH of below 2 and preferably 0.1 to 0.9.

Typical FCC catalyst compositions will include the following range of ingredients:

| Aluminum Phosphate: | 10 to 44 wt. % |
|---|---|
| Zeolite/Molecular Sieve: | 2 to 70 wt. % |
| Inorganic Solid: | 0 to 88 wt % |

While spray drying at gas inlet/outlet temperatures of 600° to 750° F./280°–350° F. is used in the preparation of FCC catalysts, other forming/drying techniques such as pelletizing and extruding may be used to prepare catalysts/catalyst supports which are useful in catalytic processes such as hydrocracking, hydrotreating, isomerization, dewaxing, etc.

Preferred FCC catalysts which contain from about 5 to 60 wt. % Beta zeolite, 0 to 78 wt. % kaolin, and 12 to 46 wt. % aluminum phosphate are used to crack feedstocks such as gas-oil, residual oil and mixtures thereof which may contain up to 1.0 wt. % Conradson Carbon and 300 to 8000 ppm Ni & V. Based on MAT data, the anticipated cracked product stream obtained using these preferred catalysts will typically contain from 13 to 32 wt. % C$_3$ and C$_4$ olefins of which 2 to 6 wt. % comprises isobutylene which is particularly valuable for the production of MTBE.

It is found that the dried aluminum phosphate binder possesses a surface area of less than about 5 m$^2$/g as determined by the nitrogen BET method, and a total pore volume of less than 0.10 cc/g as determined from the adsorption isotherm for nitrogen at liquid nitrogen temperatures and at a relative pressure (P/Po) of at least 0.97. When an additional matrix component such as silica, alumina, magnesia or silica-alumina sols or gels is added the matrix component of the catalyst may have a surface area of up to 300 m$^2$/g and more preferably up to 100 m$^2$/g.

Having described the basic aspect of our invention the following specific examples are given to illustrate specific preferred embodiments.

EXAMPLE 1

Preparation of Aluminum Phosphate Binder Solution with an Al$_2$O$_3$/P$_2$O$_5$ ratio of 0.68

2439 g of a 60.2% (wt.) Al(NO$_3$)$_3$.9H$_2$O solution were added to 758.7 g of 75% phosphoric acid solution and mixed well. The pH of the resulting solution was less than 0.5.

EXAMPLE 2

Preparation of Aluminum Phosphate Binder Solution with an Al$_2$O$_3$/P$_2$O$_5$ ratio of 1.0

2548.8 g of a 60.2% (wt.) Al(NO$_3$)$_3$.9H$_2$O solution were added to 1004.7 g of 40% phosphoric acid solution and mixed well. The pH of the resulting solution was less than 0.5.

The procedures of Examples 1 and 2 illustrate the production of low pH aluminum phosphate binder solution at an Al$_2$O$_3$/P$_2$O$_5$ molar ratio of 0.68 and 1.0, respectively. The material isolated from this binder system either by spray drying or by removing the water at 110° C. is a highly crystalline, low surface area, low pore volume material. Table I below summarizes the typical chemical/physical and X-ray diffraction data of the aluminum phosphate of Example 2.

TABLE I

| Chemicals. wt. % | | | |
|---|---|---|---|
| Al$_2$O$_3$ | | | 41.80% |
| P$_2$O$_5$ | | | 58.20% |
| Surface area | 1 m$^2$/g | | — |
| Pore Volume (N$_2$) | 0.017 cc/g | | — |
| X-Ray Diffraction Pattern (Example 2) | | | |
| d spacings | I/Io | d spacing | I/Io |
| 4.362 | 100 | 2.511 | 20 |
| 4.122 | 97 | 2.409 | 4 |
| 3.857 | 49 | 2.326 | 7 |
| 3.376 | 10 | 2.143 | 4 |
| 3.278 | 11 | 2.107 | 5 |
| 3.205 | 5 | 2.063 | 4 |
| 3.156 | 6 | | |
| 2.998 | 11 | | |
| 2.867 | 7 | | |

EXAMPLE 3

Preparation of ZSM-5 Containing Catalyst using Aluminum Phosphate Binder 700 g of ZSM-5, 3258.4 g of kaolin clay and 3298.4 g of water were added to 3 197.7 g of aluminum phosphate binder as prepared in Example 1. The resulting mixture (pH ~0.5) was mixed well before being spray dried. The chemical physical properties of three samples of catalyst prepared as above and designated as Catalyst A1, A2, and A3 are presented in Table 2.

TABLE II

| CHEMICAL/PHYSICAL PROPERTIES | | | |
|---|---|---|---|
| | Catalyst ID: | | |
| | Catalyst A1 | Catalyst A2 | Catalyst A3 |
| Chemical Properties, wt. % | | | |
| Al$_2$O$_3$ | 37.24 | 37.36 | 37.04 |
| SiO$_2$ | 49.98 | 49.37 | 50.80 |
| Na$_2$O$_3$ | 0.13 | 0.14 | 0.13 |
| SO$_4$ | 0.41 | 0.43 | 0.30 |
| TiO$_2$ | 1.82 | 1.77 | 1.85 |
| Fe$_2$O$_3$ | 1.06 | 1.07 | 1.06 |
| P$_2$O$_5$ | 9.01 | 9.52 | 8.25 |
| Physical Properties | | | |

TABLE II-continued

| CHEMICAL/PHYSICAL PROPERTIES | | | |
|---|---|---|---|
| | Catalyst ID: | | |
| | Catalyst A1 | Catalyst A2 | Catalyst A3 |
| ABD[1], cc/g | 0.82 | 0.81 | 0.81 |
| DI[2] | 0 | 3 | 2 |
| SA[3], m²/g | 53 | 52 | 55 |

[1] Average Bulk Density
[2] Davison Index
[3] BET Surface Area

EXAMPLE 4

Preparation of ZSM-5 Containing Catalyst using Aluminum Phosphate Binder 1000 g of ZSM-5, 3706 g of kaolin clay, 3000 g of Ludox silica-sol AS-40, and 4900 g of water were added to 5320.4 g of aluminum phosphate binder as prepared in Example 2. The resulting mixture (pH~0.5) was mixed well before being spray dried. The chemical physical properties of this catalyst, designated as Catalyst B, are presented in Table III.

EXAMPLE 5

Preparation of High Ratio ZSM-5 Containing Catalyst using Aluminum Phosphate Binder 1000 g of high ratio ($SiO_2/Al_2O_3$=~500) ZSM-5, 3706 g of kaolin clay, 3000 g of Ludox AS-40, and 4900 g of water were added to 5320.4 g of aluminum phosphate binder as prepared in Example 2. The resulting mixture (pH~0.5) was mixed well before being spray dried. The chemical physical properties of this catalyst, designated as Catalyst C, are presented in Table III.

EXAMPLE 6

Preparation of BETA Zeolite Containing Catalyst using Aluminum Phosphate Binder

A BETA zeolite slurry was made by mixing 1743 g of BETA zeolite powder and 3079 g of water. Dry powdered kaolin (1617 g) was added to 5655 g of an aluminum phosphate binder solution as prepared in Example 2 above. The BETA slurry was added to the aluminum phosphate/clay slurry and the resulting mixture was mixed well before being spray dried. The resulting catalyst had a formulation of 40% BETA, 22% aluminum phosphate, and 38% Clay. The chemical physical properties of this catalyst, designated as Catalyst D, are presented in Table III.

EXAMPLE 7

Preparation of Low Cell Size USY Containing Catalyst using Aluminum Phosphate Binder with $Al_2O_3/P_2O_5$ ratio of 1.0

A slurry containing 1200 g of low soda, low cell size USY (24.39 Å, 0.53% $Na_2O$, 700 m²/g) and 2800 g of water were added to a slurry containing 1482.4 g of kaolin clay and 3837.8 g of an aluminum phosphate binder solution prepared as in Example 2. The resulting slurry (pH~0.6) was mixed well before being spray dried. The chemical physical properties of this catalyst, designated as Catalyst E, are presented in Table III.

EXAMPLE 8

Preparation of Low Cell Size USY Containing Catalyst using Aluminum Phosphate Binder A slurry containing 1800 g of low soda, low cell size USY (24.39 Å, 0.53% $Na_2O$, 700 m²/g) and 4200 g of water were added to a slurry containing 529.4 g of kaolin clay and 5330.5 g of an aluminum phosphate binder solution prepared as in Example 2. The resulting slurry (pH~0.6) was mixed well before being spray dried. The chemical physical properties of this catalyst, designated as Catalyst F, are presented in Table III.

EXAMPLE 9

Preparation of BETA Zeolite Catalyst with $SiO_2$ Sol

A slurry containing 2000 g of BETA zeolite ($SiO_2/Al_2O_3$ basis) and 4643 g of water was acidified to a pH of 4.0 with 20% $H_2SO_4$. To this slurry was added 10,000 g of silica sol (prepared from sodium silicate and acid alum) and 2353 g of kaolin clay (TV=15%) and the resulting mixture was spray dried. The catalyst, which had a formulation of 40% BETA, 20% $SiO_2$ sol, and 40% Clay, was successfully ion-exchanged with 3% ammonium sulfate solution. The chemical physical properties of this catalyst, designated as Catalyst G, are presented in Table III.

EXAMPLE 10

Preparation of BETA Zeolite Catalyst with Alumina Sol 2471 g of kaolin clay and 3830 g of aluminum chlorhydrol sol having 23% $Al_2O_3$ and a Cl/Al mol ratio of 0.5 were mixed using a high shear mixer. To this was added 7143 g of a BETA zeolite slurry containing 2000 g of BETA zeolite and 4643 g of water. The mixture was spray dried and calcined for 2 hours at 1000° F. The finished catalyst had the following composition: 40% BETA, 18% $Al_2O_3$, 42% Clay. The chemical physical properties of this catalyst, designated as Catalyst H, are presented in Table III.

EXAMPLE 11

Preparation of ZSM-5 Zeolite Catalyst with $SiO_2$ Sol

A slurry containing 1436.7 g of ZSM-5 and 2873.3 g of water was acidified to a pH of 4.0 with 20% $H_2SO_4$. To this slurry was added 11,000 g of silica sol (prepared from sodium silicate and acid alum) and 3116 g of kaolin clay (TV=15%) and the resulting mixture was spray dried. The catalyst, which had a formulation of 25% ZSM-5, 22% $SiO_2$ sol, and 53% Clay, was successfully ion-exchanged with 3% ammonium sulfate solution. The chemical and physical properties of this catalyst, designated as Catalyst I, are presented in Table III.

EXAMPLE 12

Preparation of High Ratio ZSM-5 Zeolite Catalyst with $SiO_2$ Sol

The catalyst was prepared as described in Example 11 with the exception that 1436.7 g of high ratio ZSM-5 was used. The chemical physical properties of this catalyst, designated as Catalyst J, are presented in Table III.

EXAMPLE 13

Preparation of ZSM-5 Containing Catalyst using Aluminum Phosphate Binder and with Calcined Silica Replacing Clay A slurry consisting of 1142.9 g of ZSM-5, 5523.4 g of a calcined silica gel, and 13,333.7 g of water was milled in a Drais Mill at a rate of 0.5 liters/minute. The resulting slurry was remilled at the same milling rate. To 12,500 g of this doubled milled ZSM-5/silica slurry was added 3553.6 g of aluminum phosphate binder as prepared in Example 2. The resulting mixture (pH~0.85) was mixed well before being spray dried. The chemical physical properties of this catalyst, designated as Catalyst K, are presented in Table III.

TABLE III

Properties of Catalysts

| | Catalyst B | Catalyst C | Catalyst D (Example) | Catalyst E | Catalyst F |
|---|---|---|---|---|---|
| | (4) | (5) | (6) | (7) | (8) |
| Composition, wt. % | | | | | |
| $Al_2O_3$ | 28.70 | 28.33 | 28.57 | 35.73 | 31.90 |
| $SiO_2$ | 60.66 | 61.02 | 56.23 | 50.30 | 52.23 |
| $Na_2O$ | 0.25 | 0.28 | 0.18 | 0.33 | 0.39 |
| $SO_4$ | 1.06 | 1.05 | 0.37 | 0.55 | 0.43 |
| $P_2O_5$ | 7.23 | 7.20 | 13.01 | 11.53 | 14.30 |
| Physical Properties | | | | | |
| Davison Attrition Index (DI) | 1 | 3 | 32 | 0 | 10 |
| Bulk Density (g/cm$^3$) | 0.92 | 0.87 | 0.66 | 0.71 | 0.62 |
| Surface Area (m$^2$/g) | — | — | 291 | 238 | 339 |

| | Catalyst G | Catalyst H | Catalyst I (Example) | Catalyst J | Catalyst K |
|---|---|---|---|---|---|
| | (9) | (10) | (11) | (12) | (13) |
| Composition, wt. % | | | | | |
| $Al_2O_3$ | 22.26 | 39.91 | 26.64 | 25.51 | 7.57 |
| $SiO_2$ | 74.88 | 57.22 | 69.86 | 71.07 | 84.43 |
| $Na_2O$ | 0.11 | 0.19 | 0.11 | 0.13 | 0.26 |
| $SO_4$ | 0.86 | 0.66 | 1.03 | 0.95 | 0.42 |
| $P_2O_5$ | 0.08 | 0.09 | 0.11 | 0.13 | 7.02 |
| Physical Properties | | | | | |
| Davison Attrition Index (DI) | 10 | 5 | 5 | 10 | >60 |
| Bulk Density (g/cm$^3$) | 0.74 | 0.76 | 0.85 | 0.79 | 0.32 |
| Surface Area (m$^2$/g) | 275 | 257 | 113 | 115 | — |

The use of alumina phosphate binder compositions of Examples 1 and 2 for the production of enhanced activity, attrition resistant (low DI) catalysts containing ZSM-5 (SiO$_2$/Al$_2$O$_3$ ratios of ~26 and ~500, kaolin clay and from 0 to 20% wt. of a highly reactive colloidal silica sol is shown in Examples 3–5. An example in which all of the kaolin clay diluent has been replaced with an unreactive, calcined silica gel is given in Example 13. In this case, the catalyst produced by spray drying the ZSM-5, the silica gel and the aluminum phosphate binder produced a soft (high DI, low attrition resistant) catalyst.

The use of the aluminum phosphate binder system for the production of enhanced activity catalysts containing BETA zeolite, and low cell size, low soda (~24.39 Å, 0.5% Na$_2$O) USY (at 40% and 60% wt. in catalyst) in combination with kaolin clay are shown in Examples 6–8.

The procedure used in making comparison catalysts containing ZSM-5 and BETA bound using standard silica sol and alumina sol binders are given in Examples 9–12.

Chemical/physical properties of the above catalysts are presented in Tables II and III.

EXAMPLE 14

Data which illustrates the hydrocarbon cracking activity enhancement, after a steam deactivation, imparted to the catalysts by the low pH aluminum phosphate binder system of the present invention are presented in Tables IV to VIII and in FIGS. 2–8.

Catalysts of the invention and comparison catalysts were tested for cracking activity in a standard microactivity test (MAT) as described in Oil and Gas Journal, 1976, vol. 64, pages 7, 84, 85 and Nov. 22, 1971, pages 60–68. This same test is described in the ASTM standard microactivity test method D 3907-8. The characteristics of the feedstock used in the test are given in Table IV.

Before testing, all catalysts were steamed in a fluidized bed steamer for 4 hours at 815° C. under 100% wt. % steam at 0 psig. In the examples illustrated below where the catalysts were tested as additives, the catalysts were blended on a wt. %/wt. % basis with OCTACAT ®, a commercially available USY containing cracking catalyst manufactured by the Davison Chemical Company.

TABLE IV

| Feedstock Characteristics | |
|---|---|
| API Gravity @ 60° F. | 22.5 |
| Specific Gravity @ 60° F. | 0.9186 |
| Aniline Point: °F. | 163 |
| Sulfur: wt. % | 2.59 |
| Total Nitrogen: ppm | 860 |
| Basic Nitrogen: ppm | 350 |
| Conradson Carbon: wt. % | 0.25 |
| Ni: ppm | 0.8 |
| V: ppm | 0.6 |
| Fe: ppm | 0.6 |
| Cu: ppm | <0.1 |
| Na: ppm | 0.6 |
| Br: ppm | <5 |
| Cl: ppm | <20 |
| D-1160 Distillation | |

TABLE IV-continued

| Feedstock Characteristics | |
|---|---|
| Vol. %, °F. @ 1 atm. | |
| IBP | 423 |
| 5 | 585 |
| 10 | 615 |
| 20 | 649 |
| 30 | 684 |
| 40 | 720 |
| 50 | 755 |
| 60 | 794 |
| 70 | 834 |
| 80 | 881 |
| 90 | 932 |
| 95 | 976 |
| EP | 1027 (99%) |
| Watson "K-Factor" | 11.52 |

TABLE V

Interpolated Data MAT Product Distribution for Blends of OCTACAT and ZSM-5 Catalysts

| | Catalyst: | | | | |
|---|---|---|---|---|---|
| | Octacat | 90% Octacat 10% Catalyst I (Comparison) | 90% Octacat 10% Catalyst B (Invention) | 90% Octacat 10% Catalyst J (Comparison) | 90% Octacat 10% Catalyst C (Invention) |
| As Synthesized $SiO_2/Al_2O_3$ Framework Ratios of ZSM-5 Zeolites: | | ~26:1 | ~26:1 | ~500:1 | ~500:1 |
| Wt. % ZSM-5 Zeolite in Catalyst Addtive: | | 25% | 15% | 25% | 15% |
| Binder Type: | | $SiO_2$ Binder | $AlPO_4$ Binder | $SiO_2$ Binder | $AlPO_4$ Binder |
| Yields (wt. %) | | | | | |
| Conv. (wt. %) | 60.0 | 60.0 | 60.0 | 60.0 | 60.0 |
| $H_2$ | 0.085 | 0.094 | 0.090 | 0.094 | 0.094 |
| $C_1 + C_2$ | 1.60 | 1.70 | 1.70 | 1.75 | 1.75 |
| $C_3=$ | 3.8 | 5.8 | 8.1 | 5.2 | 5.8 |
| Total $C_3$'s | 4.6 | 6.8 | 8.9 | 6.2 | 6.6 |
| Total $C_3= + C_4=$ | 9.2 | 12.7 | 16.2 | 12.0 | 13.1 |
| $C_4=$ | 5.4 | 6.9 | 8.1 | 6.8 | 7.3 |
| $i-C_4$ | 2.4 | 2.9 | 3.1 | 2.3 | 2.5 |
| $n-C_4$ | 0.5 | 0.6 | 0.6 | 0.5 | 0.5 |
| Total $C_4$'s | 8.3 | 10.4 | 11.8 | 9.9 | 10.3 |
| $C_5$ + Gasoline | 43.5 | 38.5 | 35.2 | 39.6 | 39.0 |
| Coke | 1.90 | 2.20 | 2.20 | 2.20 | 2.20 |
| PONA RON | 90.9 | 91.9 | 93.1 | 91.8 | 92.3 |
| PONA MON | 79.9 | 80.6 | 81.0 | 80.6 | 81.0 |

TABLE VI

Interpolated Data MAT Product Distribution

| | Catalyst: | | | |
|---|---|---|---|---|
| | OCTACAT | Catalyst H 40% BETA in $Al_2O_3$ Matrix | Catalyst G 40% BETA in $SiO_2$ Matrix | Catalyst D 40% BETA in $AlPO_4$ Matrix |
| C/O | 3.9 | 4.2 | 5.2 | 3.7 |
| Conversion, wt. % | 60 | 60 | 60 | 60 |
| YIELDS, WT. % | | | | |
| $H_2$ | 0.090 | 0.121 | 0.061 | 0.053 |
| Total $C_1 + C_2$ | 1.75 | 2.10 | 2.60 | 1.76 |
| $C_3=$ | 4.3 | 7.0 | 9.4 | 6.1 |
| Total $C_3$'s | 5.0 | 8.3 | 10.6 | 7.0 |
| 1-Butene | 1.2 | 1.6 | 1.8 | 1.6 |
| Isobutylene | 1.6 | 3.8 | 4.2 | 3.6 |
| trans-2-Butene | 1.7 | 2.7 | 3.1 | 2.4 |
| cis-2-Butene | 1.1 | 1.5 | 1.8 | 1.5 |
| Total $C_4=$ | 5.7 | 9.7 | 10.9 | 9.1 |
| $i-C_4$ | 2.4 | 2.0 | 2.9 | 2.5 |
| $n-C_4$ | 0.5 | 0.7 | 0.7 | 0.6 |
| Total $C_4$'s | 8.6 | 12.4 | 14.6 | 12.2 |
| $C_5$ + Gasoline | 42.4 | 33.4 | 29.5 | 37.1 |
| Coke, wt. % Feed | 2.20 | 3.65 | 2.66 | 1.91 |
| PONA RON | 91.2 | 94.1 | 95.4 | 93.6 |
| PONA MON | 80.2 | 80.0 | 81.6 | 80.2 |
| Wt. % $C_5$ + Gasoline Fraction: | | | | |
| iso-Paraffins | 29.8 | 17.2 | 17.4 | 20.6 |
| Olefins | 26.6 | 47.8 | 44.6 | 42.6 |
| Aromatics | 29.7 | 22.1 | 26.1 | 23.7 |
| C4 Olefin Selectivities: | | | | |
| 1-Butene/$C_4=$ | 0.21 | 0.16 | 0.17 | 0.18 |
| Isobutylene/$C_4=$ | 0.28 | 0.39 | 0.39 | 0.40 |
| trans-2-Butene/$C_4=$ | 0.30 | 0.28 | 0.28 | 0.26 |
| cis-2-Butene/$C_4=$ | 0.19 | 0.15 | 0.17 | 0.16 |

TABLE VII

Interpolated MAT Product Distribution Data

| | 100% OCTACAT | 90% OCTACAT 10% Cat. D | 80% OCTACAT 20% Cat. D | 70% OCTACAT 30% Cat. D | 60% OCTACAT 40% Cat. D | 50% OCTACAT 50% Cat. D | 100% Cat. D |
|---|---|---|---|---|---|---|---|
| Conversion, wt. % | 60.0 | 60.0 | 60.0 | 60.0 | 60.0 | 60.0 | 60.0 |
| YIELDS, WT. % | | | | | | | |
| H2 | 0.093 | 0.082 | 0.079 | 0.082 | 0.079 | 0.082 | 0.069 |
| Total C1 + C2 | 2.00 | 1.90 | 1.70 | 1.80 | 1.70 | 1.80 | 1.70 |
| C3= | 4.3 | 4.4 | 4.3 | 4.7 | 4.7 | 5.1 | 6.3 |
| Total C3's | 5.1 | 5.1 | 5.1 | 5.2 | 5.6 | 5.9 | 7.1 |
| 1-Butene | 1.2 | 1.2 | 1.2 | 1.2 | 1.3 | 1.3 | 1.6 |
| Isobutylene | 1.7 | 1.8 | 2.0 | 2.2 | 2.2 | 2.4 | 3.4 |
| trans-2-Butene | 1.8 | 1.9 | 1.9 | 1.9 | 1.9 | 2.0 | 2.4 |
| cis-2-Butene | 1.1 | 1.2 | 1.1 | 1.2 | 1.2 | 1.3 | 1.5 |
| Total C4= | 5.8 | 6.1 | 6.2 | 6.4 | 6.6 | 7.0 | 8.9 |
| Total C4's | 8.7 | 9.0 | 9.1 | 9.4 | 9.8 | 10.3 | 12.3 |
| C5 + Gasoline | 41.9 | 41.6 | 41.8 | 41.2 | 40.6 | 39.6 | 36.5 |
| Coke, wt. % Feed | 2.2 | 2.3 | 2.2 | 2.3 | 2.2 | 2.3 | 2.3 |
| PONA RON | 91.2 | 91.4 | 91.2 | 91.7 | 91.7 | 92.3 | 93.7 |
| PONA MON | 80.3 | 80.1 | 79.8 | 80.1 | 80.0 | 80.3 | 80.3 |
| Wt. % C5 + Gasoline Fraction: | | | | | | | |
| iso-Paraffins | 30.4 | 29.1 | 28.2 | 27.4 | 27.0 | 26.2 | 21.8 |
| Olefins | 26.7 | 28.9 | 30.2 | 31.6 | 31.6 | 33.4 | 41.4 |
| Aromatics | 29.1 | 28.0 | 27.2 | 26.9 | 27.2 | 26.7 | 23.8 |
| C4 Olefin Selectivities: | | | | | | | |
| 1-Butene/C4= | 0.21 | 0.20 | 0.19 | 0.19 | 0.20 | 0.19 | 0.18 |
| Isobutylene/C4= | 0.29 | 0.30 | 0.32 | 0.34 | 0.33 | 0.34 | 0.38 |
| trans-2-Butene/C4= | 0.31 | 0.31 | 0.31 | 0.30 | 0.29 | 0.29 | 0.27 |
| cis-2-Butene/C4= | 0.19 | 0.20 | 0.18 | 0.19 | 0.18 | 0.19 | 0.17 |

TABLE VIII

| | Catalyst: | | |
|---|---|---|---|
| | OCTACAT | Catalyst E (40% USY/ 18% AlPO4) | Catalyst F (60% USY/ 25% AlPO4) |
| C/O | 4.6 | 4.0 | 2.8 |
| Conversion, wt. % | 65 | 65 | 65 |
| YIELDS, WT. % | | | |
| H2 | 0.113 | 0.062 | 0.062 |
| Total C1 + C2 | 2.3 | 2.3 | 2.3 |
| C3= | 5.2 | 4.6 | 4.4 |
| Total C3's | 6.1 | 5.8 | 5.5 |
| 1-Butene | 1.4 | 1.2 | 1.1 |
| Isobutylene | 1.7 | 1.2 | 1.0 |
| trans-2-Butene | 2.0 | 1.8 | 1.6 |
| cis-2-Butene | 1.3 | 1.1 | 1.0 |
| Total C4= | 6.4 | 5.2 | 4.7 |
| i-C4 | 2.9 | 3.4 | 3.4 |
| n-C4 | 0.6 | 0.8 | 0.8 |
| Total C4's | 9.9 | 9.4 | 8.9 |
| C5 + Gasoline | 44.0 | 44.8 | 45.6 |
| Coke, wt. % Feed | 2.6 | 2.6 | 2.6 |
| PONA RON | 91.5 | 90.4 | 89.3 |
| PONA MON | 80.8 | 80.8 | 80.8 |
| Wt. % C5+ Gasoline Fraction: | | | |
| iso-Paraffins | 30.1 | 36.1 | 36.1 |
| Olefins | 24.4 | 17.4 | 17.4 |
| Aromatics | 32.3 | 33.2 | 33.2 |
| C4 Olefin Selectivities: | | | |
| 1-Butene/C4= | 0.22 | 0.23 | 0.23 |
| Isobutylene/C4= | 0.27 | 0.23 | 0.21 |
| trans-2-Butene/C4= | 0.31 | 0.35 | 0.34 |
| cis-2-Butene/C4= | 0.20 | 0.21 | 0.21 |

The micro activity test data plotted in FIGS. 2-5 illustrate the effect of the aluminum phosphate binder component on the activity of the ZSM-5 containing catalyst. Catalyst A1, with its aluminum phosphate binder, shows a substantial increase in activity over the standard catalyst, Catalyst 1, made the conventional route with standard silica sol. These results are quite impressive considering the fact that the sieve content of the Catalyst 1 blend is 2.5 wt. % where as Catalyst A1 blend contains only 1.5 wt. % zeolite. Based on these light olefin yield shifts, Catalyst A1 exhibits over four times the activity of Catalyst 1. Adjusting to activity per unit zeolite, Catalyst A1 provides a six fold activity increase. The MAT yield structure, at constant conversion, for blends containing catalysts of this invention and of comparison catalysts, is presented in Table V. Although the increase in activity of the higher silica alumina ratio ZSM-5 zeolite is not as great as the lower ratio material, the activity is directionally the same.

The advantages in hydrocarbon cracking activity and selectivity of the BETA Zeolite catalyst with its aluminum phosphate binder, Catalyst D, compared to BETA Zeolite bound by the conventional silica sol, Catalyst G, and alumina sol, Catalyst H, binders, are presented in Table VI. At a constant MAT conversion, Catalyst D is more active, as evidenced by the lower catalyst to oil ratio, and produces less hydrogen, total $C_1+C_2$ hydrocarbons, and coke, but substantially more $C_5+$ gasoline. Compared to OCTACAT ®, Catalyst D has equivalent activity, produces lower hydrogen and coke and produces almost 2.5 times the isobutylene. In addition, the $C_5+$ gasoline fraction produced is lower in aromatics and higher in olefins than that produced by OCTACAT. Table VII and FIGS. 6-9 show MAT results, at constant conversion, for blends of OCTACAT and Catalyst D. These results show an increase in isobutylene yield and selectivity and a shift to lower aromatics and higher olefins in the $C_5+$ gasoline fraction as the amount of Catalyst D in the blend increases.

Table VIII compares the MAT results, at constant conversion, for OCTACAT and aluminum phosphate bound USY catalysts, Catalyst E (40% USY/18% AlPO4) and Catalyst F (60% USY/25% AlPO4). These results show that, compared to OCTACAT, Catalysts E and F have higher activity, produce lower hydrogen and $C_3+C_4$ hydrocarbons and have a higher $C_5+$ gasoline yield. The motor octanes for these $C_5+$ gasoline fractions, as determined by a gas chromatographic method, are all equivalent, indicating a greater octane barrel potential for Catalysts D and E over OCTACAT.

EXAMPLE 15

The MAT data in Table IX listed below for steam deactivated silica sol (Ludox AS-40) bound clay and aluminum phosphate (of this invention) bound clay illustrate the lack of cracking activity for the crystalline low surface area aluminum phosphate binder of this invention and the lack of the ability of this aluminum phosphate binder system to impact any activity to an inert catalyst component such as clay.

TABLE IX

| Catalyst Composition: (wt. %) | 70% Clay 30% AlPO$_4$ | 70% Clay 30% SiO$_2$ |
|---|---|---|
| Catalyst to Oil | 2.96 | 2.97 |
| Conversion wt. % | 11.0 | 12.4 |
| H$_2$ | 0.02 | 0.05 |
| Total C$_1$ + C$_2$ | 0.79 | 0.77 |
| Total C$_3$'s | 0.7 | 0.7 |
| Total C$_4$ Olefins | 0.5 | 0.5 |
| Total C$_4$'s | 0.6 | 0.6 |
| C$_5$ + Gasoline | 8.1 | 9.2 |
| Coke, wt. % feed | 0.70 | 0.9 |

We claim:

1. A method for the catalytic cracking of hydrocarbons which comprises reacting a hydrocarbon under catalytic cracking conditions in the presence of a catalyst which comprises a zeolite selected from the group consisting of ultrastable Y, ZSM-5, Beta, SAPO, ALPO and mixtures thereof and a crystalline aluminum phosphate binder having a surface area of less than 20 m$^2$/g and a total pore volume of less than 0.1 cc/g.

2. The method of claim 1 wherein said catalyst contains clay.

3. The method of claim 1 wherein said crystalline aluminum phosphate binder has a surface area of less than 5 m$^2$/g.

4. The method of claim 1 conducted under fluid catalytic cracking conditions at a reaction temperature of about 400° to 700° C. and regeneration temperature of 500° to 850° C.

5. The method of claim 1 wherein said hydrocarbon is selected from the group consisting of gas-oil, residual oil and mixtures thereof.

6. The method of claim 1 wherein the catalyst comprises 5 to 60 weight percent Beta xeolite, 0 to 78 weight percent kaolin, and 12 to 46 weight percent aluminum phosphate, and a cracked product stream is produced which contains 13 to 32 weight percent C$_3$ and C$_4$ olefins of which 2 to 6 weight percent comprises isobutylene.

* * * * *